May 14, 1963 G. K. KOCHER 3,089,530
RUBBER AND METAL TIRE
Filed Aug. 29, 1961

INVENTOR.
GEORGE K. KOCHER
BY *Oldham & Oldham*
ATTYS.

United States Patent Office 3,089,530
Patented May 14, 1963

3,089,530
RUBBER AND METAL TIRE
George K. Kocher, 604 Elmira St., White Haven, Pa.
Filed Aug. 29, 1961, Ser. No. 134,746
2 Claims. (Cl. 152—288)

This invention relates to vehicle tires, and, more particularly, is concerned with tires made of rubber and metal, and which are not pneumatically inflated.

It is the general object of the invention to provide a vehicle tire characterized by inexpensiveness of manufacture and maintenance, excellent qualities of cushioning and resilience, and by long life.

Another object of the invention is to provide a rubber tire having a body which is not reinforced with fabric or cords, and which can be rapidly and inexpensively manufactured, as by an extruding operation, and which is resiliently suported in use by a plurality of helically coiled metal springs, each spring being joined end to end and forming a toroid, the springs being positioned one inside the other.

The foregoing objects of the invention, and other objects which will become apparent as the description proceeds, are achieved by the provision of a rubber tire including a rubber carcass and tread, means mounting the tire, and a plurality of helically-coiled metal springs inside the tire, each spring being joined end to end to form a toroid, the plurality of springs being positioned one inside the other, with the outermost spring engaging with the inside of the tire, and with each spring inwardly from the outermost spring being coiled in opposite direction so that the coils cross each other at an angle and resiliently engage and support the next outermost spring.

For a better understanding of the invention, reference should be had to the accompanying drawings wherein FIG. 1 is a side elevation, partially broken away, of the improved tire of the invention;

Figure 1:
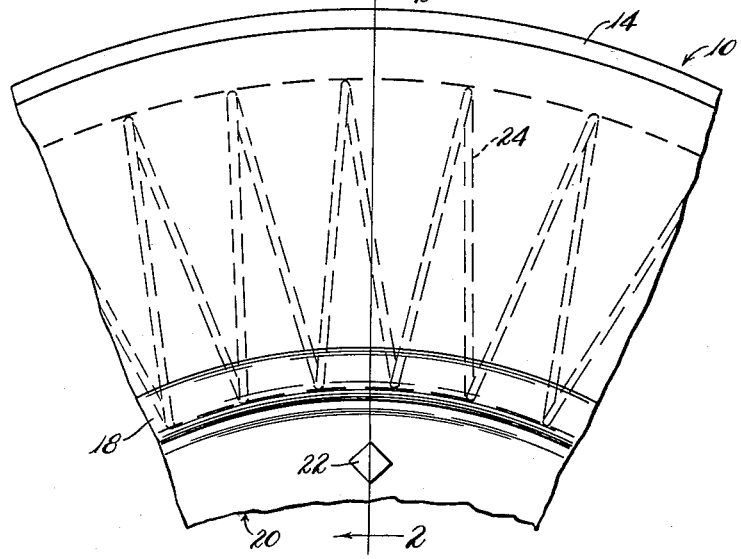
Figure 2:
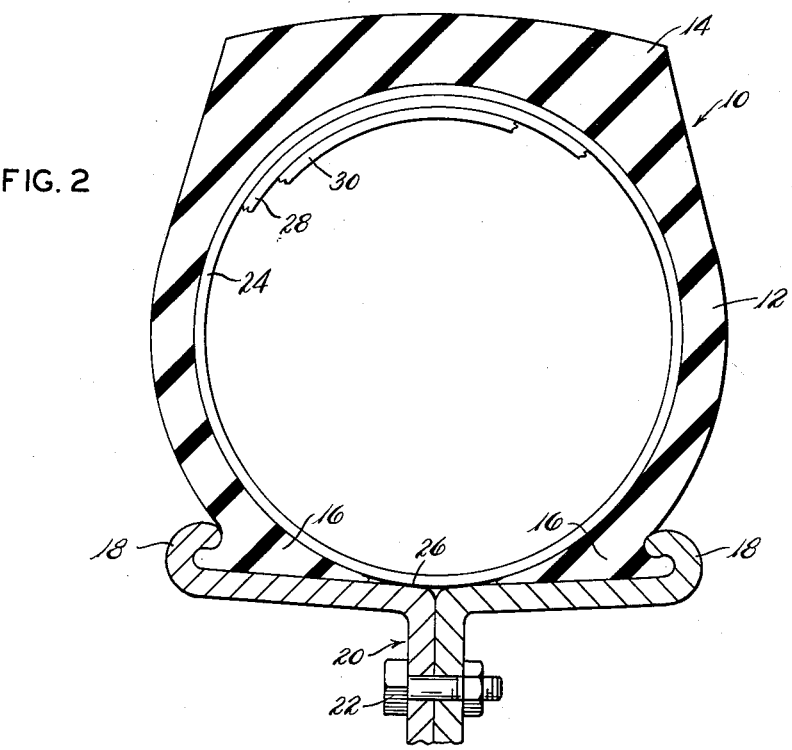
FIG. 2 is a cross-sectional view taken substantially on line 2—2 of FIG. 1.

In the drawings, the numeral 10 indicates generally a rubber tire having a carcass portion 12 and a tread portion 14, the tire being removably mounted upon a supporting wheel or rim 20.

The tire 10 is preferably, but not necessarily, made of rubber or rubber-like material only and has no fabric, cords, or other reinforcing means therein. Thus, in the preferred practice of the invention the rubber tire 10 can be made by an extruding operation to the cross-sectional contour illustrated, can be cut to tire length as extruded, and butt-jointed together at its ends, followed by vulcanization.

It will be noted that the tire 10 is formed open at the inner periphery, and with clincher type beads 16 which are engaged by flanges 18 of the tire mounting means indicated as a whole by the numeral 20. The tire mounting means 20, normally in the form of a wheel or a rim, is ordinarily made in two halves, as illustrated, these halves being bolted together, by means 22.

Figure 3:
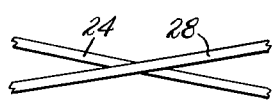
FIG. 3 is a fragmentary view illustrating the manner in which the metal springs incorporated in FIGS. 1 and 2 are coiled in opposite directions so that the indivdual convolutions cross each other at an angle.

Positioned inside of the tire 10 is a helically coiled metal spring 24, the ends of which are joined together to form a toroid, and with each convolution of the metal spring 24 closely engaging with the entire inner transverse peripheral surface of the inside of the tire 10 and over an arcuate portion 26 with the tire supporting means 20 to provide an integral resilient tire assembly. Positioned inside of the spring 24 is one or more additional springs. In the embodiment of the invention illustrated a spring 28 is positioned inside of the spring 24, and a spring 30 is positioned inside of the spring 28. Each of the springs 28 and 30 comprise helically coiled metal springs joined into an endless toroid form, but with the adjacent springs being coiled in opposite directions. For example, the spring 24 is coiled in a right-hand direction, the spring 28 in a left-hand direction, and the spring 30 in a right-hand direction. The result is that the individual coils or convolutions of the several springs cross each other at an angle, as shown in FIG. 3, so that the convolutions of the several springs do not drop between the convolutions of adjacent springs, but cross the convolutions of an adjacent spring at an angle to thereby have the innermost spring resiliently support the next outermost spring in a radial direction to provide the additional resilient support for the tire 10.

The metal springs 24, 28 and 30 are normally formed of very high strength steel wire, such as piano wire, and of a gauge to provide the required resilient support for the tire assembly 10 for any given installation. It will be understood that the improved tire combination of the invention is adapted to a relatively wide variety of uses, and that it can be made in any of a wide variety of sizes, and for supporting a wide variety of loads. For example, the gauge of the spring wire, as selected for a given use, may vary from as little as 1/32 of an inch, for light use, up to 1/4 of an inch, or more, for heavy use.

The term "rubber," as utilized throughout the specification and claims, is intended to cover any natural or synthetic rubber materials, or other rubber-like materials employed in tire construction.

In the manufacture of the tire assembly described the innermost spring will be wound to toroid form, the next outermost spring will be wound with opposite hand on the first spring, and any additional spring layers will be wound to complete the assembly of the metallic spring core for the tire. This core can be resiliently compressed in a circumferential direction to allow it to be inserted into the tire 10 between the beads 16. The tire is then mounted upon the mounting means 20, and the tightening up of the bolts 22 compresses the tire about the spring core. The engagement of the spring core with both the inside of the tire, and with the arcuate portion 26 of the wheel or tire mounting means 20 provides a complete tire and mounting assembly which is resilient and flexible in use when loaded within the limits for which the tire assembly has been designed, and with the tire assembly being long-lived, substantially maintenance-free and relatively inexpensive to manufacture.

The tire assembly of the invention normally has no air pressure other than atmospheric therein, so that the tire is puncture-proof, and with the tire being adapted to a wide variety of uses for vehicles ranging from wheelbarrows up through golf carts and other off-the-road light equipment including velocipedes and bicycles. Of course, the tire of the invention can also be utilized on road vehicles such as automobiles and trucks.

While a certain representative embodiment and details have been shown for the purpose of illustrating the invention, it will be apparent to those skilled in this art that various changes and modifications may be made therein without departing from the spirit or scope of the invention.

What is claimed is:

1. In combination, a rubber tire including a rubber carcass, a pair of endless beads, a tread, means mounting the tire, a plurality of helically coiled metal springs inside the tire, each spring being joined end to end to form a toroid, the plurality of springs being positioned one inside the other, each convolution of the outermost spring engaging the entire transverse periphery of the inside of the tire and with the means mounting the tire to resiliently support the tire, each spring inwardly from the outermost spring being coiled in opposite directions so that the convolutions cross each other at angles to resiliently engage and support the next outermost spring at crossover points, the tire being open around its inner circumferential periphery, and with the means mounting the tire gripping the beaded edges thereof to pull the open inner periphery together so as to squeeze the tire around the outermost spring.

2. In combination, a tire assembly, a rotatable annular support for the assembly having a pair of axially spaced flanges, said assembly including in combination a rubber carcass, a pair of annular beads positionable, respectively, against the flanges of said support, a tread, an endless helical spring means positioned inside the carcass so that each convolution thereof is in engagement with and creates a radially outward pressure on the entire inner transverse peripheral surface of the carcass and with the annular support to resiliently support the carcass, a plurality of helical springs positioned within said helical spring means, each helical spring being joined end to end to form a toroid, the plurality of springs being placed one inside the other, each inside spring creating a radially outward pressure on the spring outside it, and each spring being coiled in opposite directions so that the coils cross each other at an angle.

References Cited in the file of this patent
UNITED STATES PATENTS

| | | |
|---|---|---|
| 1,001,686 | Restucci | Aug. 29, 1911 |
| 1,397,448 | Norris | Nov. 15, 1921 |
| 1,982,135 | Daddio | Nov. 27, 1934 |
| 2,523,695 | Greene | Sept. 26, 1950 |

FOREIGN PATENTS

| | | |
|---|---|---|
| 489,324 | France | Sept. 17, 1918 |
| 1,022,046 | France | Dec. 10, 1945 |
| 404,326 | Great Britain | Jan. 15, 1934 |